(12) United States Patent
Christensen et al.

(10) Patent No.: US 6,530,197 B1
(45) Date of Patent: Mar. 11, 2003

(54) GROUND CONTACT HEIGHT SENSOR

(75) Inventors: Timothy Franklin Christensen, Orion, IL (US); Klaus Ernst Becker, East Moline, IL (US); Paul Thomas Wessel, Greenwood, IN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/571,247

(22) Filed: May 16, 2000

(51) Int. Cl.[7] .................. A01D 75/00; A01B 63/111
(52) U.S. Cl. ................ 56/10.2 E; 172/4; 56/DIG. 10
(58) Field of Search ................ 56/10.2 R, 10.2 D, 56/10.2 E, 119, DIG. 10, DIG. 3; 172/2, 4; 33/501.02, 501.03, 501.04

(56) References Cited

U.S. PATENT DOCUMENTS

| | | | |
|---|---|---|---|
| 2,752,835 A | * 7/1956 | Wright | 172/4 |
| 3,196,599 A | * 7/1965 | Meiners et al. | 56/10.2 E |
| 3,568,420 A | 3/1971 | Friedrich-Wilheim Hofer et al. | 56/208 |
| 4,211,057 A | * 7/1980 | Dougherty et al. | 56/10.2 E |
| 4,437,295 A | 3/1984 | Rock | 56/10.2 |
| 4,776,153 A | * 10/1988 | DePauw et al. | 56/10.2 E |
| 4,942,724 A | 7/1990 | Diekhans et al. | 56/10.4 |
| 5,090,184 A | * 2/1992 | Garter et al. | 56/10.2 E |
| 5,115,628 A | * 5/1992 | Garter et al. | 56/10.2 E |
| 5,713,190 A | * 2/1998 | Vermeulen et al. | 56/10.2 E |
| 6,041,583 A | * 3/2000 | Goering et al. | 56/10.2 E |
| 6,202,395 B1 | * 3/2001 | Gramm | 56/10.2 E |

FOREIGN PATENT DOCUMENTS

JP 515222 * 8/1991

OTHER PUBLICATIONS

Brochure entitled "Get the 'Down to Earth' Profits" with "Electrol" the Automated Header Control in you Soybean Harvest, printed in the U.S.A.

Brochure entitled "Positive Wright Control on your Combine", printed in the U.S.A.

May–Wes Manufacturing Brochure entitled "Header Height Control", 1989, printed in the U.S.A.

Brochure entitled "Imperial Electro–matic Header Control", printed in the U.S.A.

Kelly Farm Equipment Brochure entitled "Vara–Trol Twin Bar Header Control Delivers More Grain to the Bin", printed in the U.S.A.

* cited by examiner

Primary Examiner—Robert E. Pezzuto
Assistant Examiner—Nathan Mammen

(57) ABSTRACT

A ground contact height sensor for a harvesting header comprises a transverse rotatable shaft, a first rigid arm, a second rigid arm and a connecting member. The rotatable shaft is rotatively mounted to the frame of the header. The first rigid arm is rigidly mounted to the rotatable shaft. The first arm extends downwardly and rearwardly from the rotatable shaft in a curved manner. The second rigid arm is pivotally coupled to the first rigid arm by a hinge joint. The second rigid arm extends upwardly and rearwardly from the second end of the first rigid arm. The first and second rigid arms defining a relatively large radius. The connecting member secures the rearmost end of the second rigid arm to the frame of the header. To maintain the radius of the two pivotally connected rigid arms the hinge joint joining the two rigid arms is provided with a torsion spring.

9 Claims, 2 Drawing Sheets

GROUND CONTACT HEIGHT SENSOR

BACKGROUND OF THE INVENTION

1. Field of the Invention

The present invention is directed to a ground contact height sensor for a harvesting header having two pivotally coupled rigid arms.

2. Description of the Prior Art

Agricultural combines may be provided with header height control systems to control the position of the harvesting header relative to the ground. Ground contact sensors may be used to determine the distance of the bottom of the header to the ground. These ground contact sensors generally comprise a downwardly extending arm that contacts the ground below the header. As the arm is deflected upwardly by an obstruction the arm moves a mechanical linkage or a potentiometer which signals the automatic header height control system raising the harvesting header.

In one sensor configuration a J-shaped rigid arm is coupled to a transverse rotatable shaft. As the arm is deflected the shaft is rotated shifting a potentiometer or a mechanical linkage. Because of the J-shape and the rigid nature of the arm it can be difficult to store these arms inside the floor of the header. In addition, these J-shaped arms have a relatively narrow radius, so it can be difficult to put the combine in reverse without damaging the sensor.

In another sensor configuration bowed spring steel hoops form the arms. The hoops can be flattened out to fit within a recess under the floor of the platform. In addition, the hoops form a large radius facilitating reverse movement of the combine. However hoop sensors can be easily damaged during sharp turns if they are following a furrow.

SUMMARY

It is an object of the present invention to provide a ground contact height sensor that can be easily stored within a recess under the floor of the header, that will not be easily damaged during sharp turns, and that will not be easily damaged during reverse movements.

The sensor comprises a transverse rotatable shaft, a first rigid arm, a second rigid arm and a connecting member. The rotatable shaft is rotatively mounted to the frame of the header. The first rigid arm has a first end that is rigidly mounted to the rotatable shaft. The first arm extends downwardly and rearwardly from the rotatable shaft in a curved manner. The second rigid arm is pivotally coupled to the second end of the first rigid arm. The second rigid arm extends upwardly and rearwardly from the second end of the first rigid arm. The first and second rigid arms defining a relatively large radius. A connecting member secures the rearmost end of the second rigid arm to the frame of the header. In the illustrated embodiment the connecting member comprises a chain. To maintain the radius of the two pivotally connected rigid arms the hinge joint joining the two rigid arms is provided with a torsion spring. The limits of the pivoting movement is controlled by stops.

DETAILED DESCRIPTION

Figure 1:
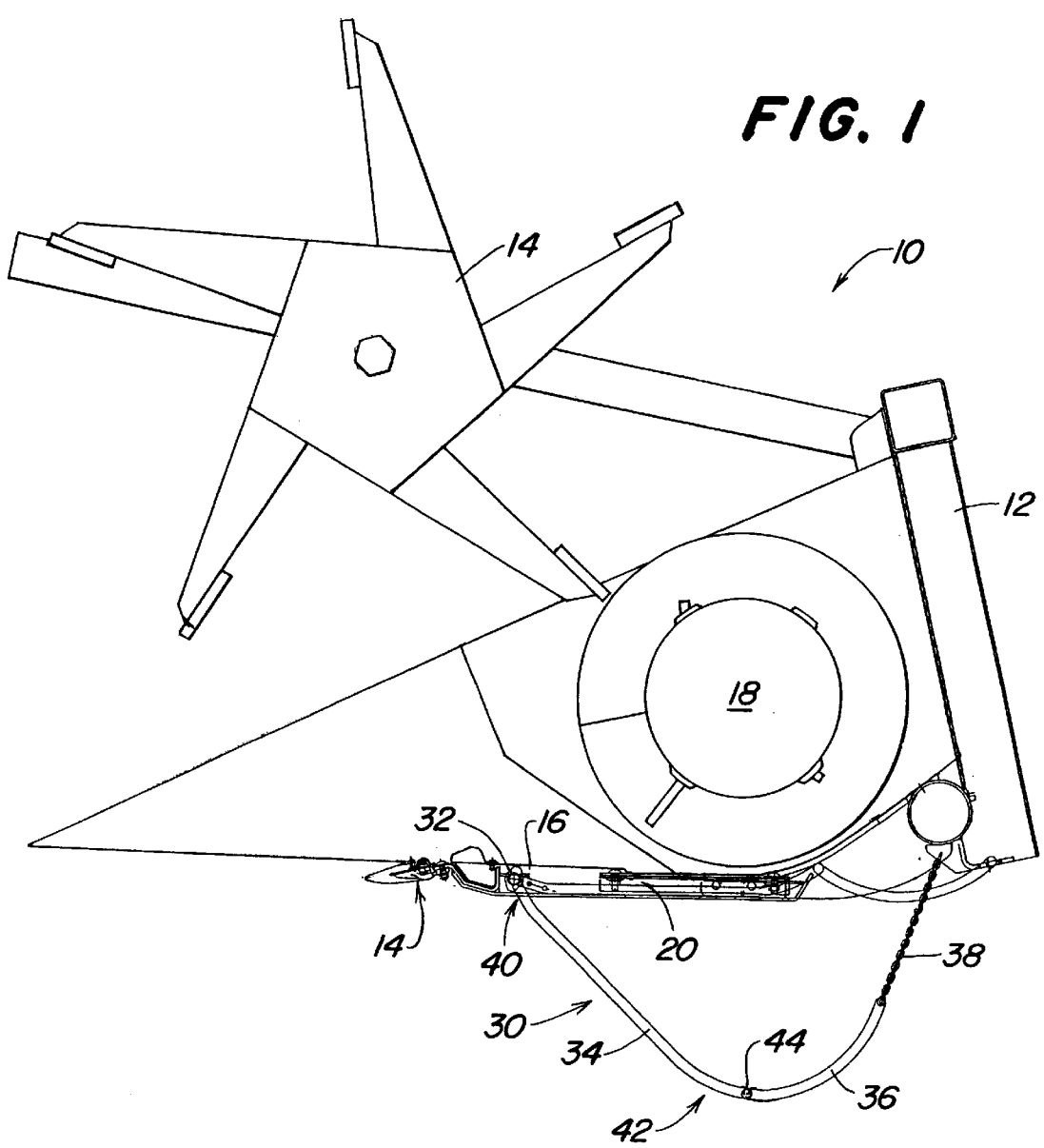
FIG. 1 is a cross sectional side view of a harvesting header having a ground engaging height sensor. The sensor being in its operative position and its stored position.
Figure 3:
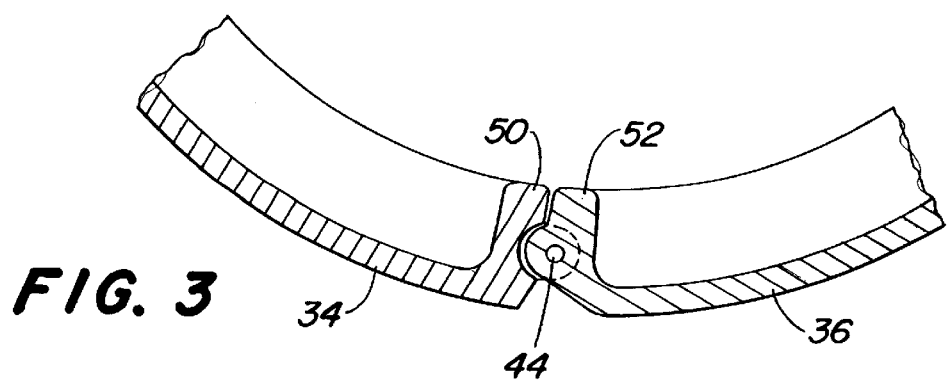
FIG. 3 is a more detailed cross sectional side view of the sensor disclosing the stops.
Figure 2:
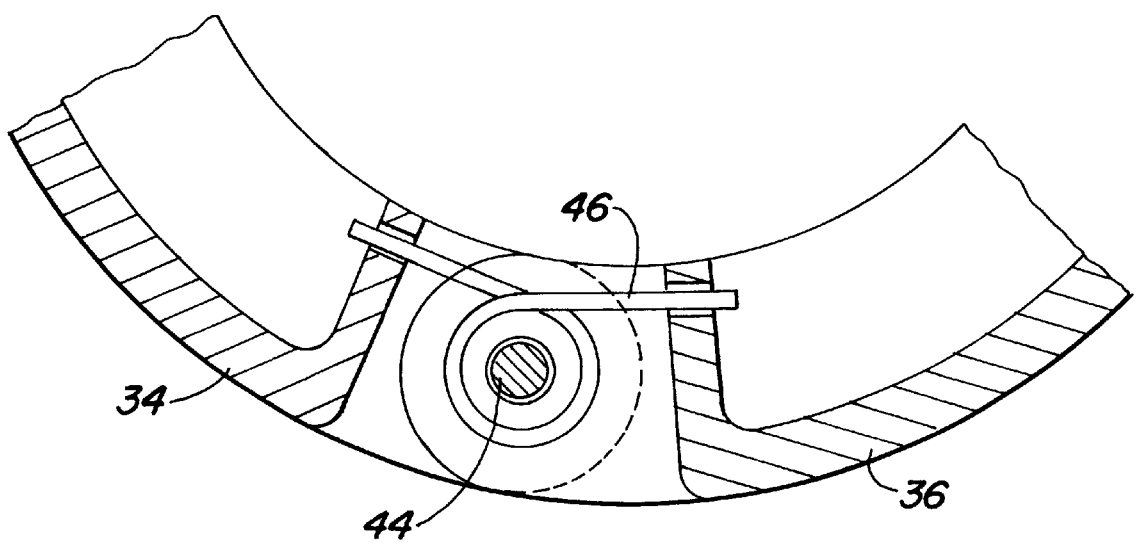
FIG. 2 is a more detailed cross sectional side view of the sensor disclosing the biasing spring.

A harvesting header 10 in the form of a harvesting platform is illustrated in FIG. 1. Although the present invention is described and illustrated as being used on a harvesting platform it may also be used on other harvesting headers, such as corn heads, row crop headers, pickup platforms and draper platforms. The harvesting header 10 is provided with a frame 12, a crop gathering unit 14 in the form of a rotating reel for directing an agricultural crop to the frame 12, and a rigid or flex cutterbar 14 for cutting the standing crop pulled towards the frame 12 by the reel. Other gathering devices are used on other harvesting headers, for example corn heads typically use gathering chains and may use augers to gather the corn stalks into the frame; row crop headers typically use serpentine belts to gather the crop; pickup platforms use a pickup belt; and air reels have also been used to gather a crop.

After the crop is cut by the cutterbar 14 it passes over the floor 16 of the flame 12 to a transverse auger 18 that concentrates the harvested crop and directs the crop to a feederhouse, not shown. The floor 16 of the frame 12 is supported on fore/aft extending supports 20.

A height sensor 30 is mounted to the frame 12 of the header. The height sensor comprises a transversely extending rotatable shaft 32, a first rigid arm 34, a second rigid arm 36, and a connecting member 38. The transversely extending rotatable shaft 32 is located immediately behind the cutterbar 14. Shaft 32 can be operatively coupled to a potentiometer for providing an electrical signal to a header height control system as to the distance of the header from the ground.

The first rigid arm 34 is provided with a first end 40 and a second end 42. The first end 40 is rigidly mounted to the rotatable shaft 34. Up and down movement of the first rigid arm 34 rotates the transversely extending rotatable shaft. From the rotatable shaft 34, the first rigid arm extends downwardly and rearwardly in a curved path. The second rigid arm 36 is pivotally coupled at hinge joint 44 to the second end 42 of the first rigid arm. The second rigid arm 36 extends upwardly and rearwardly from the hinge joint 44 in a curved manner. As illustrated in the drawings the first and second rigid arms 34 and 36 define a large radius allowing the sensor to pass over obstacles even when in reverse. Plates or skids may be fastened to the rigid arms to increase their floatation in soft ground.

The hinge joint 44 is provided with a torsion spring 46 resiliently forcing the two rigid arms into this curved radius. The spring 46 tries to pull the rigid arms together until stops 50 and 52 located on the arms come into contact with one another. Although a torsion spring is well adapted for this application, a flat spring or a coil spring could also be used. The spring needs to be strong enough to maintain the two rigid members 34 and 36 in the selected radius, but soft enough to allow the second rigid member to bounce up and down when operating on rough ground. In this way the second rigid member can absorb some of the shock loads and results in a smoother ride of the sensor.

The connecting member 38 may either be rigid or flexible. In the illustrated embodiment the connecting member is flexible and comprises a chain. The chain couples the rear of the second rigid arm 36 to the frame 12. A cable, rope or other flexible tension-transmitting member could be used in place of the chain.

The bottom of the fore/aft supports are provided with a recessed area into which the first arm may be received as illustrated in FIG. 1. The first rigid arm 32 would be pinned to the fore/aft supports. In addition, the second rigid member 34 could be sized to receive the slack portion of the chain when the sensor floats up or is stored. Such a storage system would reduce chain wear and material dragging.

The invention should not be limited by the above-described embodiments, but should be limited solely by the claims that follow.

We claim:

1. A height sensor for a harvesting header, the sensor comprising:
   a transverse rotatable shaft;
   a first rigid arm having a first end and a second end, the first end is rigidly connected to the transverse rotatable shaft, the first rigid arm extending downwardly and rearwardly from the transverse rotatable shaft;
   a second rigid arm being pivotally coupled to the first rigid arm, the second rigid arm extends rearwardly and upwardly from the second end of the first arm, wherein the first rigid arm and the second rigid arm are curved and define a radius;
   a connecting member being coupled to the second rigid arm and adapted to be coupled to said harvesting header;
   a spring that biases the first rigid arm and the second rigid arm into the radius.

2. A height sensor as defined by claim 1 wherein the connecting member is a chain.

3. A height sensor as defined by claim 1 wherein the spring is a torsion spring extending between the first rigid arm and the second rigid arm.

4. A height sensor as defined by claim 3 wherein the torsion spring is mounted to the hinge joint.

5. A harvesting header for harvesting an agricultural crop, the harvesting header comprising:
   a frame having a cutterbar and a recessed bottom;
   a gathering unit for gathering the agricultural crop to the frame;
   a height sensor coupled to the frame, the height sensor is provided with a transverse rotatable shaft which is rotatively mounted to the frame, a first rigid arm having a first end and a second end, the first end being rigidly connected to the transverse rotatable shaft, the cutterbar being located in front of the first end of the first rigid arm, the first rigid arm can be housed in the recessed bottom of the frame, the first rigid arm extending downwardly and rearwardly from the frame, a second rigid arm being pivotally coupled to the second end of the first rigid arm, the second rigid arm extends rearwardly and upwardly from the second end of the first rigid arm, wherein the first rigid arm and the second rigid arm are curved and define a radius, a spring that biases the first rigid arm and the second rigid arm into the radius, a connecting member extends between the second rigid an and the frame.

6. A harvesting header as defined by claim 5 wherein the connecting member is a chain.

7. A harvesting header as defined by claim 5 wherein the spring is a torsion spring extending between the first rigid arm and the second rigid arm.

8. A harvesting header as defined by claim 7 wherein the torsion spring is mounted to the hinge joint.

9. A harvesting header as defined by claim 5 wherein the frame is provided with fore/aft extending supports having a recessed bottom into which the first rigid arm can be housed.

* * * * *